Dec. 8, 1959  H. W. SCHOLIN ET AL  2,915,921
INDEXING MECHANISM
Filed Aug. 22, 1955  6 Sheets-Sheet 1

INVENTORS:—
HAROLD W. SCHOLIN
CARL W. SCHOLIN
BY:-
Mazzall, Johnston, Cook & Root
ATT'YS Dec. 8, 1959  H. W. SCHOLIN ET AL  2,915,921
INDEXING MECHANISM
Filed Aug. 22, 1955  6 Sheets-Sheet 2
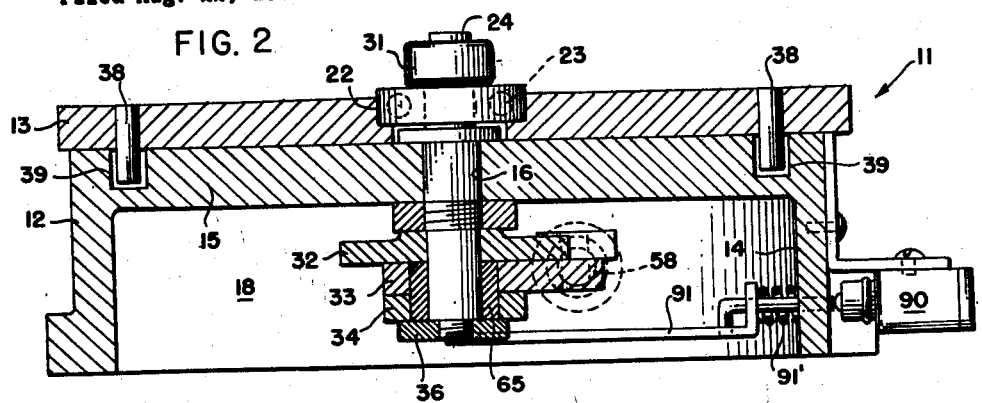
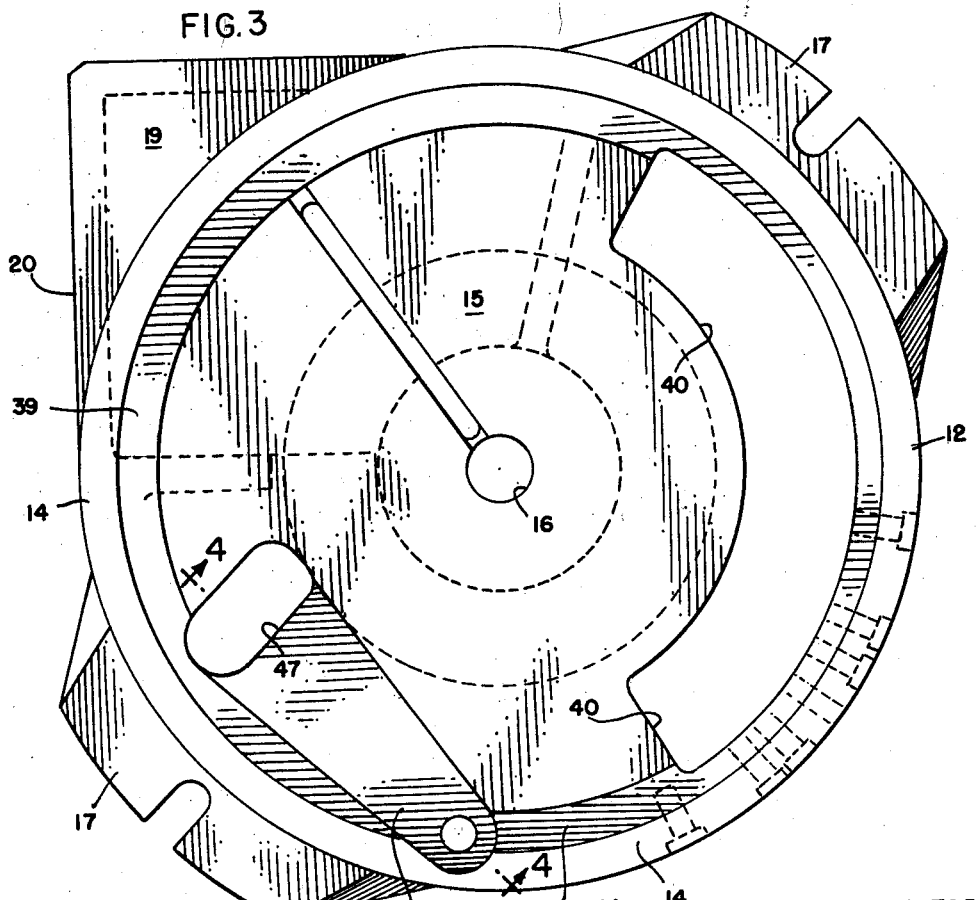
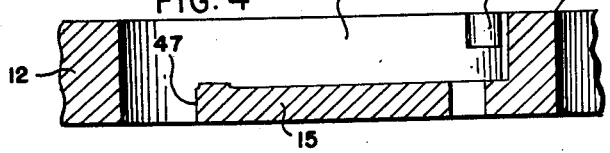
INVENTORS:-
HAROLD W. SCHOLIN
CARL W. SCHOLIN
BY:- Marzall, Johnston,
Cook & Root
ATT'YS Dec. 8, 1959  H. W. SCHOLIN ET AL  2,915,921
INDEXING MECHANISM
Filed Aug. 22, 1955  6 Sheets-Sheet 3

INVENTORS:-
HAROLD W. SCHOLIN
CARL W. SCHOLIN
BY:-
Marzall, Johnston, Cook & Root.
ATT'YS INVENTORS:—
HAROLD W. SCHOLIN
CARL W. SCHOLIN
BY:—
Marzall, Johnston, Cook & Root.
ATT'YS Dec. 8, 1959  H. W. SCHOLIN ET AL  2,915,921
INDEXING MECHANISM
Filed Aug. 22, 1955  6 Sheets-Sheet 5

INVENTORS:-
HAROLD W. SCHOLIN
CARL W. SCHOLIN
BY:-
Marzall, Johnston, Cook & Root.
ATT'YS Dec. 8, 1959    H. W. SCHOLIN ET AL    2,915,921
INDEXING MECHANISM
Filed Aug. 22, 1955    6 Sheets-Sheet 6
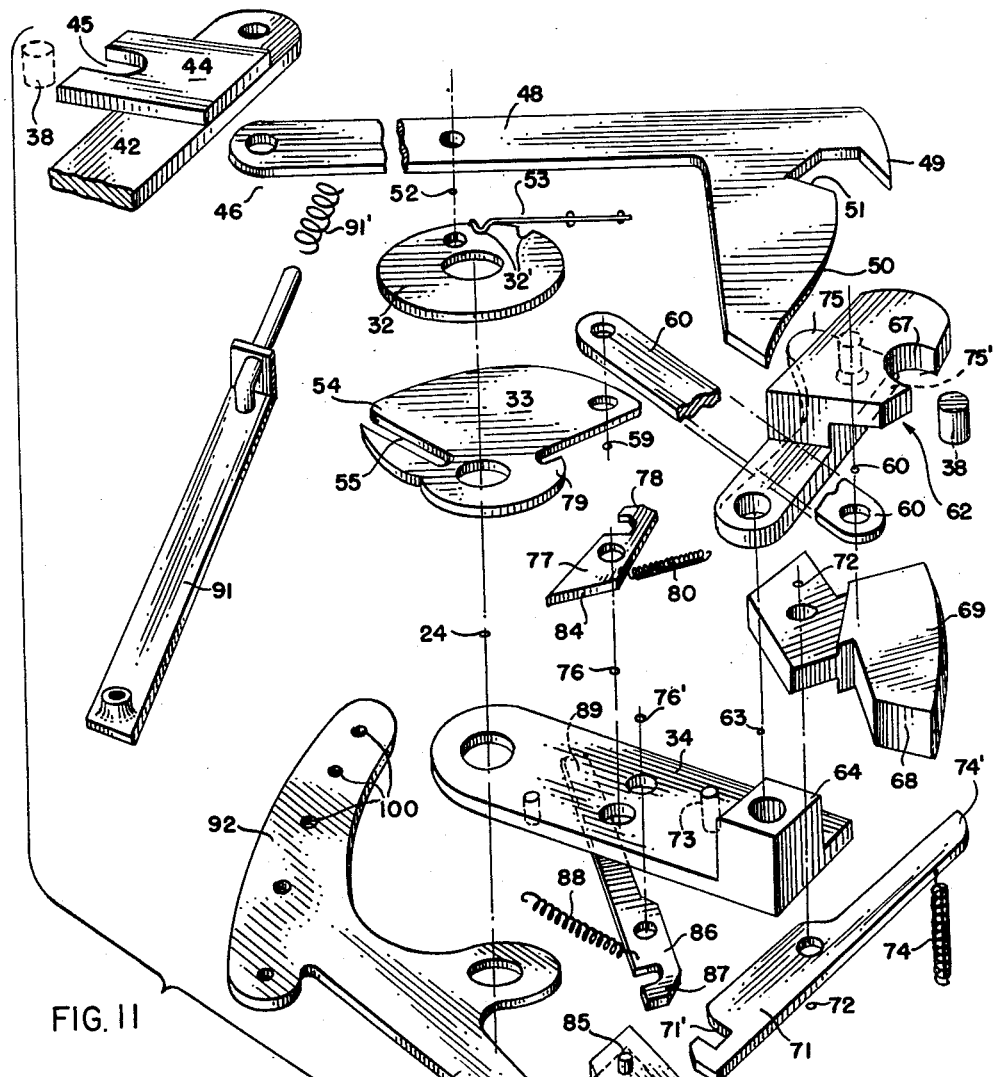
FIG. 11
FIG. 12
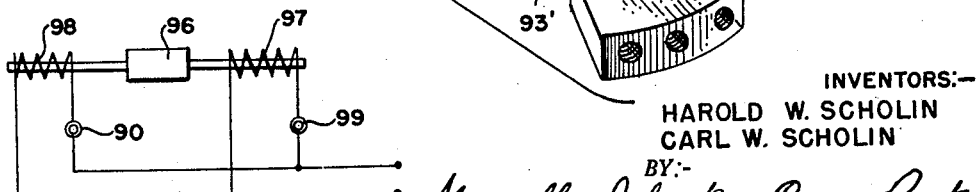
INVENTORS:—
HAROLD W. SCHOLIN
CARL W. SCHOLIN
BY:-
Marzall, Johnston, Cook & Root
ATT'YS

United States Patent Office 2,915,921
Patented Dec. 8, 1959

2,915,921

INDEXING MECHANISM

Harold W. Scholin and Carl W. Scholin, Chicago, Ill.

Application August 22, 1955, Serial No. 529,841

11 Claims. (Cl. 74—815)

The present invention relates, in general, to the indexing of work material and material working tools, the invention having more particular reference to an improved indexing mechanism comprising a support or table and associated means for turning the table selectively to and for latching the same securely in each of a plurality of precisely located angularly displaced positions.

Indexing mechanism of the character mentioned is especially useful in connection with the operation of machine tools for supporting and relatively shifting a work piece, or a plurality of work pieces, in order to successively aline the same in registration with a working tool or tools, or for selectively registering a tool or tools with respect to a work piece or several work pieces. The use of indexing mechanism, of course, is not necessarily limited to machine tools, but such mechanism may be employed wherever required to provide indexing movement.

An important object of the present invention is to provide an indexing table embodying means for turning the table about its axis through a precisely determined table displacement angle between successive indexed positions, and to latch the table firmly and securely in each indexed position; a further object being to provide improved mechanism for releasing the table latching means in response to actuation of the table turning means, at the commencement of the table shifting stroke thereof, and to relatch the table precisely in shifted indexed position at the conclusion of the operating stroke of the table turning means.

Another important object is to provide indexing mechanism comprising a turnable table structure having a plurality of equally spaced latch pins, disposed circularly on the table about its axis of turning movement, each adjacent pair of said pins subtending an accurately determined angle at the turning axis of the table, whereby said pins may determine the several indexed positions or stations to which the table may be adjusted; a further object being to provide a retractable latch in position to firmly and snugly engage each of said pins, when the table is oriented in the corresponding indexed positions, so that each latch pin, when engaged by the latch, will precisely determine and fix a corresponding indexed position of the table.

Another important object is to provide indexing mechanism of the character mentioned that can be readily adjusted to provide for any desired one of a plurality of possible displacement angles between adjacent indexing stations or positions; a further object being to provide an indexing mechanism which may be adjusted for any desired indexing angularity within its range, that is to say, to afford any desired angular displacement between adjacent indexing positions allowed by the particular number of indexing pins mounted in the table.

Another important object is to provide an indexing table embodying a plurality of preferably equally spaced apart latching and driving pins disposed circularly on said table and each equally spaced from the axis of table turning movement, a latch adapted to engage each of said pins whereby to secure the table structure in each of a plurality of angularly displaced indexing positions corresponding with the pins, and table turning means embodying a normally retracted and hence inoperative driving dog adapted for projection from retracted position to drivingly connect with a said pin to turn the table from an indexed position, corresponding with said pin, to the next adjacent indexed position; a further object being to provide means operable to retract the indexing latch from its normal pin latching position, to thus release the table structure for turning movement, as the normally inactive driving dog is moved into driving engagement with a pin in alinement therewith.

Another important object of the invention is to provide means for turning the driving dog, in one direction, about the axis of rotation of the table, from a starting position, through a precisely determined angular displacement, while latched with one of the indexing pins, whereby to shift the table structure from one indexed position to another; a further object being to provide means operable, at the conclusion of the table turning stroke of the dog, to retract the dog from driving engagement with the pin and to return the retracted dog to its starting position, in latching registration with another of said pins.

Another object of the invention is to provide adjustable stop means adapted to be mounted in any one of a plurality of positions to correspondingly limit the table turning movement of the driving dog while drivingly latched with a pin, so that the mechanism may be adjusted for any desired indexing angle allowed by the number of latching pins on the table.

Another important object is to provide means operable, during and as a consequence of dog retracting movement from pin engaging position, at the conclusion of a table turning stroke of the indexing mechanism, to project the indexing latch into latching engagement with the latch pin then presented in latching registration with the indexing latch.

Another important object is to provide for latching the table turning means in its normally inactive or standby position and to provide for releasing the mechanism for table turning action in response to pin releasing retraction of the indexing latch and pin engaging projection of the driving dog.

Another important object is to provide a dog carrying link, pivotally supporting the driving dog, and a driving link connected with said dog, said links being turnable on a common axis, whereby to project the dog from retracted to projected pin engaging position in response to relative turning movement of the driving link with respect to the dog carrying link; a further object being to provide means for drivingly interconnecting the links when the dog reaches projected pin engaging position to thereafter move the dog carrying link, together with the dog in pin engaging position thereon, in response to continued turning movement of the driving link; a still further object being to provide cam means for projecting the indexing latch into latching engagement with an index pin in response to retraction of the driving dog from pin engaging position at the end of the operating stroke of the dog, said cam means being formed to cooperate with the dog in any adjusted position thereof at the conclusion of its operating stroke; a still further object being to provide a microswitch and means for actuating the same to cause retraction of the table turning mechanism to its standby position at the conclusion of its table turning stroke, including switch operating means adjustable in accordance with the adjusted length or displacement of the table turning stroke of the driving dog.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

Fig. 2 is a sectional view taken substantially along the line 2—2 in Fig. 1;

Fig. 3 is a top view of a frame forming a support base for the indexing mechanism;

Fig. 4 is a sectional view taken substantially along the line 4—4 of Fig. 3;

Fig. 11 is a perspective view showing the several operating components of the mechanism; and Fig. 12 is a diagram of electrical connections.

Figure 1:
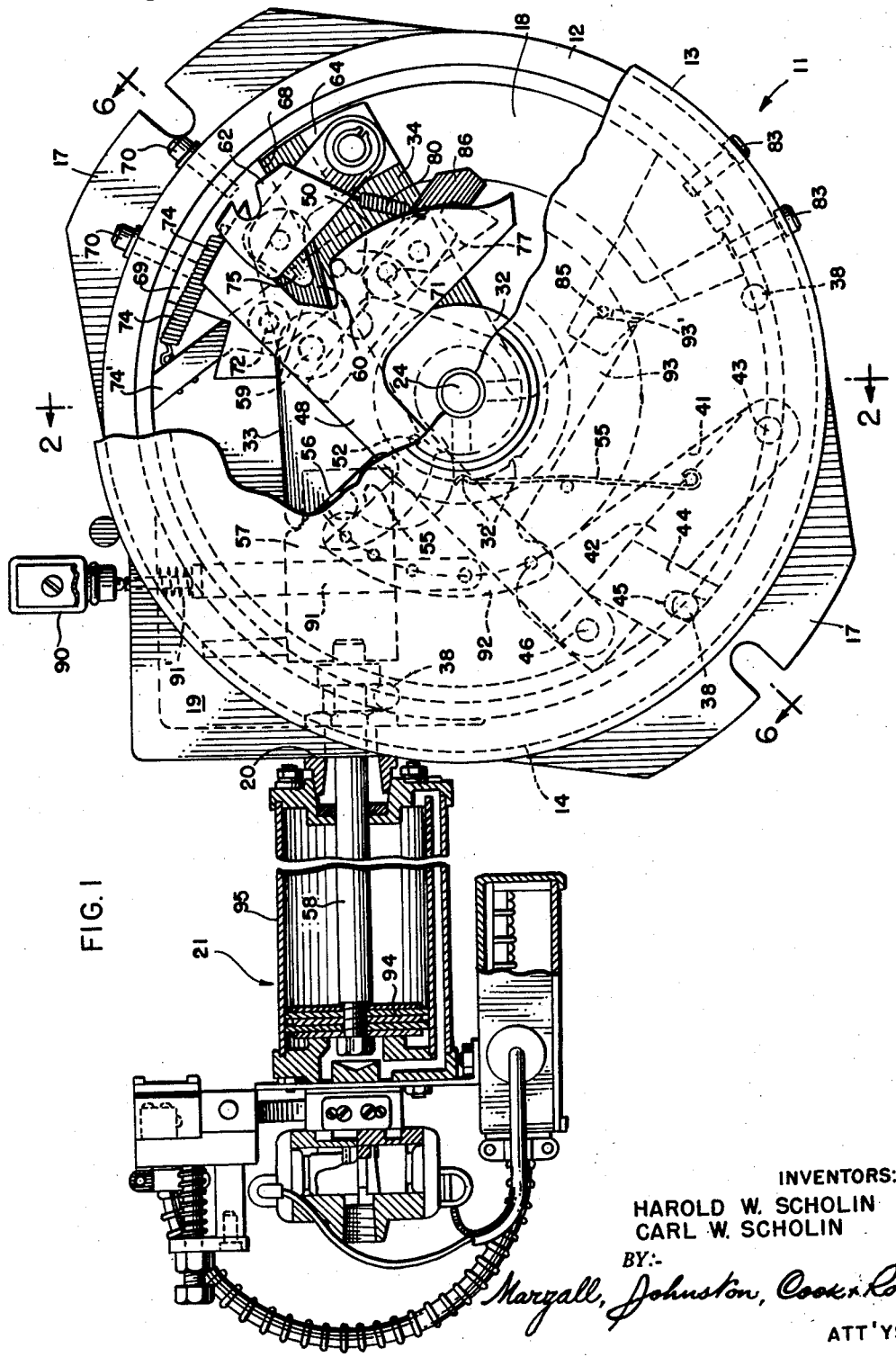
Fig. 1 is a partially sectionalized top view of indexing mechanism embodying the present invention.
Figure 5:
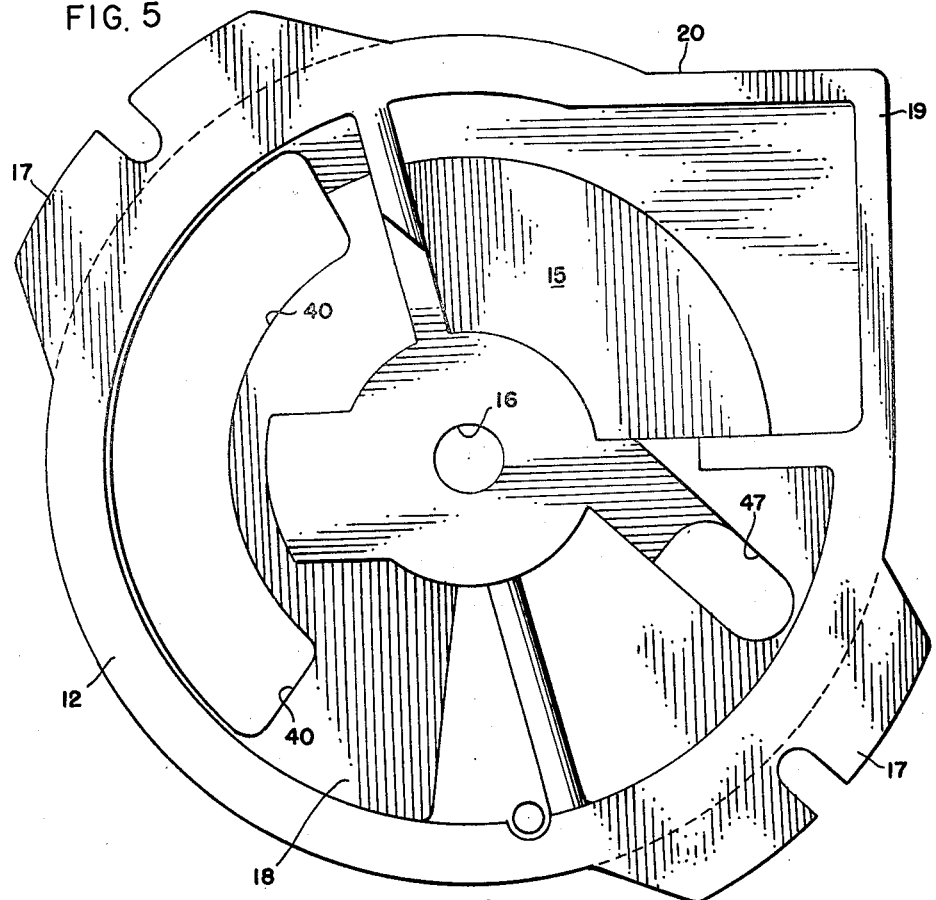
Fig. 5 is a bottom view of the frame or base shown in Fig. 3.
Figure 6:
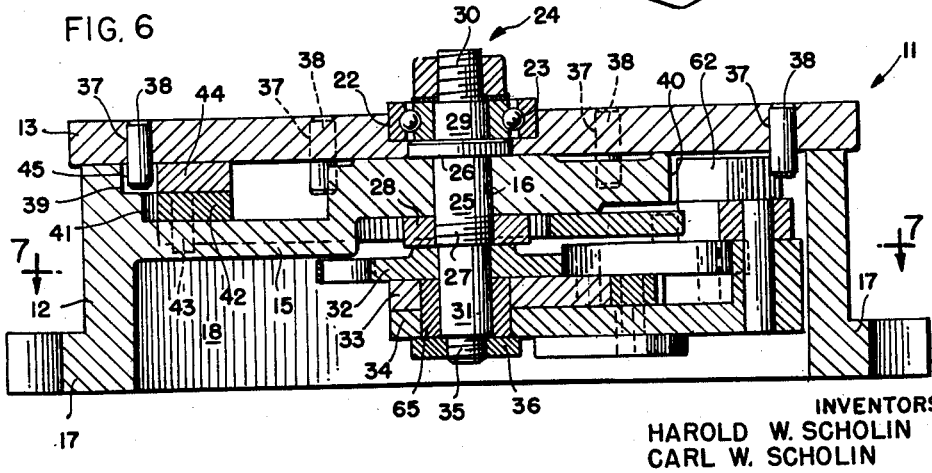
Fig. 6 is a sectional view taken substantially along the line 6—6 in Fig. 1.

To illustrate the invention, the drawings show indexing mechanism 11 comprising a frame or base 12 carrying a table member 13 turnably mounted on the base. As shown, the base may comprise a hollow frame having marginal side walls 14 of generally cylindrical configuration, a top wall 15 formed with a central opening 16, and bottom flanges 17 for aiding in the attachment of the base on any suitable support, such as the frame of a machine tool structure upon which it may be desired to mount the indexing mechanism. The frame 12 defines a chamber or cavity 18 within the side walls 14 and beneath the top wall 15. This chamber may open at the bottom of the frame, although a suitable bottom cover for the same may be provided, if desired. On one side of the frame 12, the marginal walls 14 may be formed to provide an extension 19 providing a seat 20 for the support of suitable motor means 21 for actuating the indexing mechanism, said motor means, as shown, preferably comprising a fluid pressure piston and cylindrical device, although it will be obvious that any suitable, preferred or convenient source of motive power may be employed for driving the indexing mechanism.

The table 13 may conveniently comprise a circular disc or plate formed with a central opening providing a seat 22 for a bearing 23 adapted to turnably support the table upon a spindle 24 secured on the frame 12, as in the central opening 16 thereof. Mechanism driven by the motor means 21 is provided for turning the table member 13 about the axis of the spindle 24, from any one of a plurality of angularly displaced indexed positions, through a precisely determined displacement angle, to another of said indexed positions, said mechanism including means for latching the table precisely in each of said indexed positions. Such table turning and latching mechanism may be and preferably is mounted within the chamber 18 and comprises driven links, carried by the spindle 24, and latches and latch actuating cams, operated by said links, for controlling the angular displacement of the table member about the spindle.

The spindle 24 may comprise a stem having a portion 25 sized to snugly fit the central opening 16 of the support frame, a flange portion 26 adapted to overlie the top of the wall 15 at the opening 16, and a preferably threaded portion 27 adjacent the portion 25 and adapted to extend beneath the wall 15 for the reception of a fastening nut 28, to thereby secure the spindle 24 rigidly on the wall 15, as by clamping the wall between the flange 26 and the nut 28. The spindle 24 may also include a portion 29, formed to carry the bearing 23, and a threaded portion 30 for the reception of a holding nut adapted to secure the bearing on the spindle. The spindle 24 may also include a portion 31 disposed on the side of the threaded portion 27 remote from the stem mounting portion 25, said spindle portion 31 projecting downwardly of the wall 15 and centrally within the chamber 18 in position to turnably support driving links 32, 33 and 34 forming a part of the table turning and latching mechanism of the present invention, the spindle 24 being preferably threaded, as at 35, for the reception of a fastening nut 36 which serves to secure the links 32, 33 and 34 pivotally upon the spindle portion 31.

The table member 13 is preferably formed with a plurality of circularly spaced and accurately positioned indexing teeth 38, of any suitable or preferred form. Such teeth, if desired, may be formed integrally on the member 13, and may have any preferred sectional shape or form. As shown, the teeth 38 may conveniently comprise cylindrical pins fitted into openings 37 formed in the member 13, inwardly of the marginal edge thereof. These openings are preferably of like diametral dimension and are equally spaced from the axis of the spindle 24, which defines the axis of rotation of the table member 13 in the frame or base 12. The openings 37 may each carry a corresponding indexing pin 38 firmly press fitted therein, said pins preferably projecting beneath the underside of the table plate 13. The openings 37 are located with extreme care and precision in the table plate 13 to present the pins 38 in position such that the axes of each adjacent pin pair subtend an accurately determined indexing angle, at the axis of the spindle 24, which angle is preferably identical to the angle subtended by the axes of every other adjacent pair of pins 38.

In order to accommodate the ends of the pins 38 which project beneath the underside of the plate 13, the wall 15 of the base may be formed with an upward opening circular channel 39. The wall 15 may also be formed with an arcuate opening 40 therethrough, in position intercepting the channel 39, said opening subtending an angle, at the axis of the spindle 24, at least somewhat greater than the maximum indexing displacement to be accomplished by the mechanism. As shown in the illustrated embodiment, the opening 40 subtends an angle of the order of one hundred twenty degrees.

The wall 15 may also be formed with an upwardly opening shallow pocket 41 of generally triangular shape, which pocket may also intercept the channel 39 on the side of the spindle 24 remote from the opening 40. The bottom of the pocket 41 may be and preferably is depressed substantially below the bottom of the channel 39. A latch member 42 comprising an arm pivotally mounted at one end, on a pivot pin 43, is provided for swinging movement within the pocket 41. The pivot pin 43 is preferably spaced from the axis of the spindle 24 a distance substantially equal to the spacement of the pin 38 from the axis of said spindle. Because the bottom of the pocket 41 is depressed beneath the bottom of the channel 39, the pins 38, during turning movement of the table member 13, may pass freely over the pivot pin 43 and the pivotally mounted end of the latch member 42.

The latch member 42, however, includes an upwardly offset latching head 44, spaced from the pivot pin 43 and swingable within the end of the pocket 41 remote from the pivot pin 43, said latching head being formed with a latching notch 45 having an open end and spaced facing sides curved on circles centered at the axis of the pivot pin 43. The facing sides of the latching notch 45 are spaced apart a distance equal to the diametral dimension of the latch pins 38 whereby to snugly receive any one of the latching pins 38, within the latching notch 45, when the member 42 is in the latching position shown in Figs. 1, 7 and 10 of the drawings. The pivot pin 43, of course, should be firmly mounted in the frame 12 and accurately fitted in the member 42. The facing pin engaging surfaces forming the opposite side of the latching notch 45 also should be precisely and accurately located and finished. Accordingly, when the member 42 is in latching engagement with any of the pins 38, the table 13 will be latchingly secured precisely in angularly oriented position, on the spindle 24, corresponding with the location, in the member 13, of the index pin 38 with which the latch means 42 is then latchingly engaged.

Means is provided for retracting the latch 42 from pin latching position by moving the same within the cavity 41 about the pivot pin 43, and for advancing the latch, from such retracted position, into latching engagement with a pin 38 disposed in latching position opposite the notch 45. The end of the latch member 42, remote from the pivot pin 43, may be provided with a driving pin 46 extending downwardly of the latch through an opening 47 formed in the wall 15, said opening communicating the cavity 41 with the chamber 18 beneath the wall 15. Below the wall 15, the pin 46 may be connected with one end of an arm or link 48 which extends thence transversely of the frame 12 for connection with the table turning and latch actuating mechanism mounted on the base 12 within the chamber 18. The end of the arm 48, remote from the pin 46, may be formed with a finger 49 and an integral projecting arm having an edge forming a cam 50, the member 48 being formed with a notch 51 between the finger 49 and the cam 50.

The link 32 serves to hold the latch 42 yieldingly in latched and in released or retracted position. To this end, the link 32 may comprise a circular plate freely turnable on the spindle 24 and carrying a pin 52 in position to pivotally connect with the arm 48, medially of the ends thereof, whereby to drivingly interconnect the latch member 42 with the link 32. The link 32 may be formed with peripherally spaced latching notches 32' in position to receive the detent portion of a yielding latch which, as shown, may conveniently comprise a leaf spring 53. The spring 53 may be mounted, as on the underside of the wall 15, in position to yieldingly press the detent portion thereof upon the peripheral edge of the link 32, whereby to engage said detent portion in the spaced latching notches 32', respectively, when the indexing latch 42 is in retracted and in projected latching position.

The link 33 may be of generally triangular shape, the same being pivotally mounted on the spindle 24 at one of the corners of the triangular link. The link 33, adjacent a side thereof, may provide a pair of arms 54 defining a slot 55 therebetween and extending substantially radially of the spindle 24, said slot opening at a corner of the triangular link, remote from the spindle. The slot 55 provides facing surfaces adapted to receive a driving pin 56 slidingly therebetween. This driving pin may be mounted in a clevis member 57 carried on the end of an actuating shaft 58 adapted to be axially moved in response to the operation of the motor means 21. The triangular link 33, in the corner thereof remote from the stem 24 and the open end of the driving slot 55, may carry a driving pin 59 having pivotal connection with one end of a connecting link 60, the opposite end of which is drivingly connected with a pin 61 mounted on a driving dog 62, said dog being pivotally secured on a mounting pin 63. The mounting pin 63, in turn, may be supported in a pedestal portion 64 carried by the link 34.

The link 34 may conveniently comprise a flat bar pivotally connected, at one end, on the spindle portion 31, and extending thence radially of the spindle, within the chamber 18, the spindle remote end of the link 34 terminating beneath the marginal pin carrying portions of the table member 13. The spindle mounted end of the link 34 preferably embodies a bushing 65 upon which the link 33 is mounted for turning movement, with respect to the link 34, about the axis of the spindle 24. The link 33 thus overlies the link 34 and carries a dependent pin outwardly of the spindle 24. This pin may comprise an end of the pivot pin 59 projecting beneath the link 33 in position to drivingly engage a side edge of the link 34, to turn the same in a clockwise direction, viewing Figs. 1, 7 and 8, in response to clockwise turning movement imparted to the link 33 by operation of the stem 58.

The dog carrying pedestal 64 is mounted on and extends upwardly of the link 34, within the arcuate opening 40 formed in the top wall 15 of the frame or base 12, to thereby support the dog 62 in position to latchingly engage with the ends of the pins 38. To this end, the dog 62 may be provided with a pin receiving notch 67 having facing notch defining surfaces spaced apart a distance preferably precisely equal to the diametral dimension of the pins 38.

Figure 7:
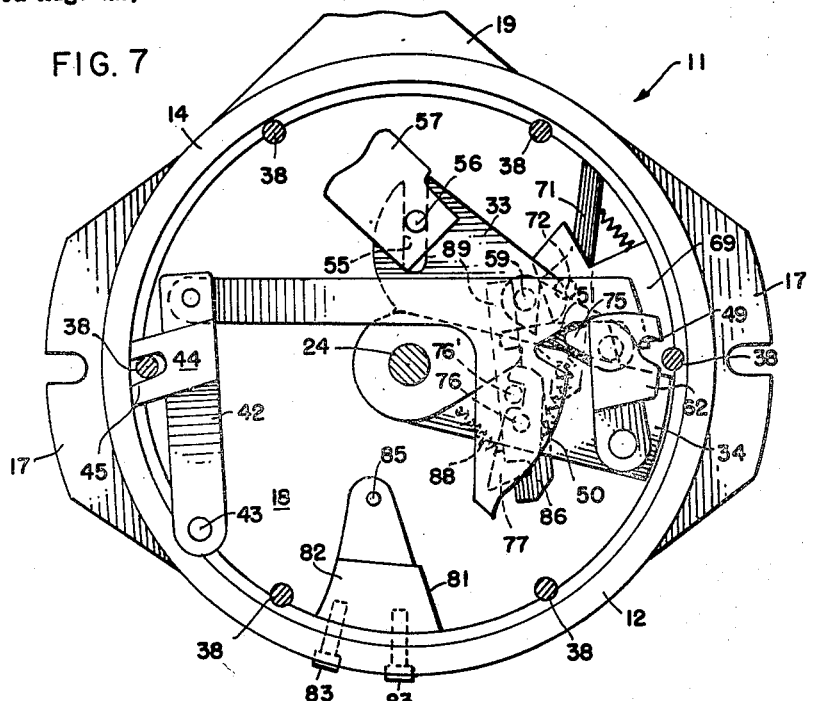
Figs. 7, 8, 9 and 10 are sectional views taken substantially along the line 7—7 in Fig. 6, and respectively showing the operating elements of the indexing mechanism in various relatively fixed positions.

The normal standby position of the parts is shown more particularly in Figs. 1 and 7. In such position the latch 42 is in holding engagement with an indexing pin 38, on one side of the table structure. The dog 62 is in retracted position, on the link 34, presenting its latched notch 67 in alinement with another of the pins 38. In such standby position, the link 34 is in abutting engagement with a stop shoulder 68 formed on a bracket 69 which is firmly secured in accurately located position in the frame or base 12, as by means of bracket fastening studs 70 anchored on and extending through the cylindrical wall 14 of the base. The link 34 may be anchored in such retracted bracket abutting position, as by means of a latch 71, pivotally mounted on a pin 72, carried by the bracket 69.

The latch 71 may be formed with a notch 71' for latchingly receiving a pin 73 carried on and extending downwardly of the link 34. The latch 71 may be normally urged toward latching position, as by means of a spring 74, connected between the bracket 69 and the end of the latch which extends on the side of the pivot pin 72 remote from the latching notch 71', said end of the latch being formed, as at 74', for bearing engagement with the inner surface of the cylindrical wall 14 of the frame, in order to limit the spring urged movement of the latch toward latching position about the pivot pin 72.

Figure 8:
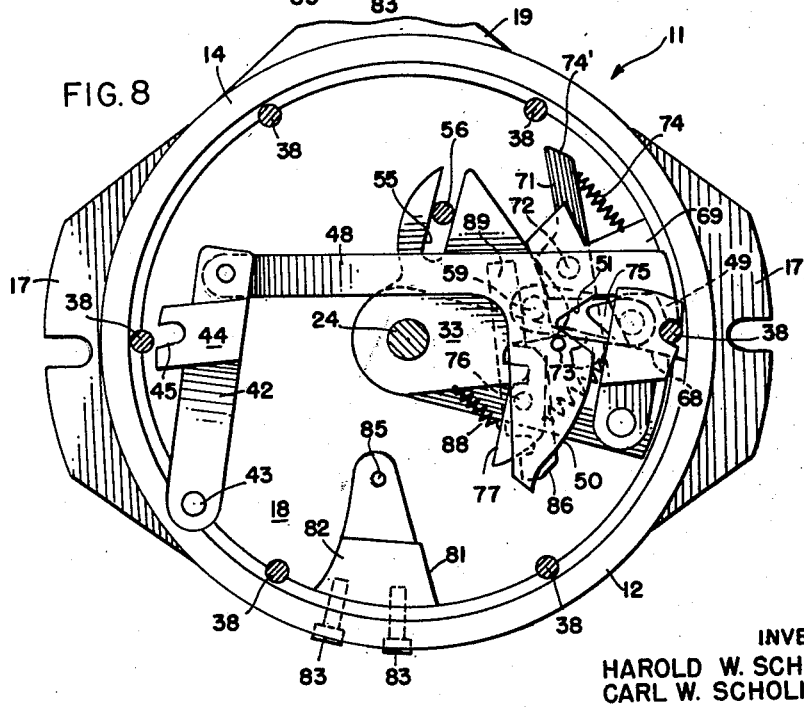

In order to shift the table 13 from an indexed position determined by engagement of the latch member 42 with one of the index pins 38, to another indexed position determined by engagement of the latch 42 with another or adjacent indexing pin, the motor means 21 may be actuated to move the shaft 58 axially inwardly of the seat 20. Such shaft movement, by action of the pin 56 in the slot 55, will turn the link 33, on the spindle 24, in a clockwise direction, viewing Figs. 1 and 7. Such movement of the link 33 will initially project the dog 62, on the latched link 34, in a clockwise direction, viewing Figs. 1 and 7, from the retracted position shown in Fig. 7 to a projected pin engaging position, as shown in Fig. 8. When in such pin engaging position, the dog 62 will be latched with the registering index pin 38 by the reception of the pin in the notch 67 of the dog.

In addition to its pin engaging position in which the notch 67 is formed, the dog provides an arm actuating portion comprising a nose 75 and an oppositely facing shoulder 75' in position to engage the finger 49, on the end of the latch actuating link 48, remote from its pivotal connection with the latch 42. Movement of the dog 62, from retracted toward pin engaging position, consequently, will shift the member 48 in a direction to retract the latch 42 from its pin engaging position, thus releasing the table for turning movement as the dog is projected from its retracted position.

At the conclusion of its initial dog projecting and latch retracting movement, the member 33 will have advanced the pivot pin 59 against the latch member 71 sufficiently to have released the same from the pin 73, against the influence of the spring 74, and also will have presented the pin 59 in driving engagement with the edge of the link 34. Means may be provided for latching the links 33 and 34 together, as the pin 59 makes driving engagement with the edge of the link 34. To this end, the link 34, inwardly of the dog mounting pedestal 64, may carry a pivot pin 76 extending upwardly thereof in position to pivotally support a latch member 77 thereon. The latch member 77 may be formed with a latching finger 78 in position to latchingly engage a cooperating lug 79, formed on the link 33, adjacent the pivot pin 59, whereby to latch the links 33 and 34 together against relative turning movement in a direction to retract the pin 59 from driving engagement with the edge of the link 34.

A spring 80, connected between the latch member 77 and a suitable anchorage on the link 34, may be provided for normally urging the latch 77 on its pivot pin in a direction to latchingly engage the finger 78 with the lug 79. As a consequence, during initial dog projecting and latch retracting movement of the member 33 with respect to the latched link 34, the latching finger 78 will be pressed against and will ride upon the end of the lug 79, under the influence of the spring 80 in readiness to latch with the lug as and when the pin 59 comes into engagement with the link 34.

Continued axial movement of the driving stem 58, inwardly of the seat 20, after the dog 62 has become latchingly engaged with an indexing pin 38, will result in relative turning movement of the latched links 33 and 34 about the spindle 24 in a clockwise direction, from the relative position of parts as shown in Fig. 8, thereby correspondingly turning the table member 13 on the spindle. Such clockwise turning movement may continue until the mechanism reaches the fully projected position shown in Fig. 9. In such position, the link 34 makes engagement with a stop shoulder 81, formed by a bracket 82 mounted on the frame 12 in position presenting the shoulder 81 in the path of movement of the link 34. The bracket 82 is preferably secured in accurately located position in the frame or base 12, as by means of bracket fastening studs 83 anchored on and extending through the cylindrical wall 14 of the base. When the table turning mechanism reaches the projected position determined by engagement of the link 34 with the stop shoulder 81, the table 13 will have turned on the spindle 24 through an exactly determined angle of displacement required to present a latching pin 38 in latching registration with the notch 45 of the latch 42.

Figure 9:
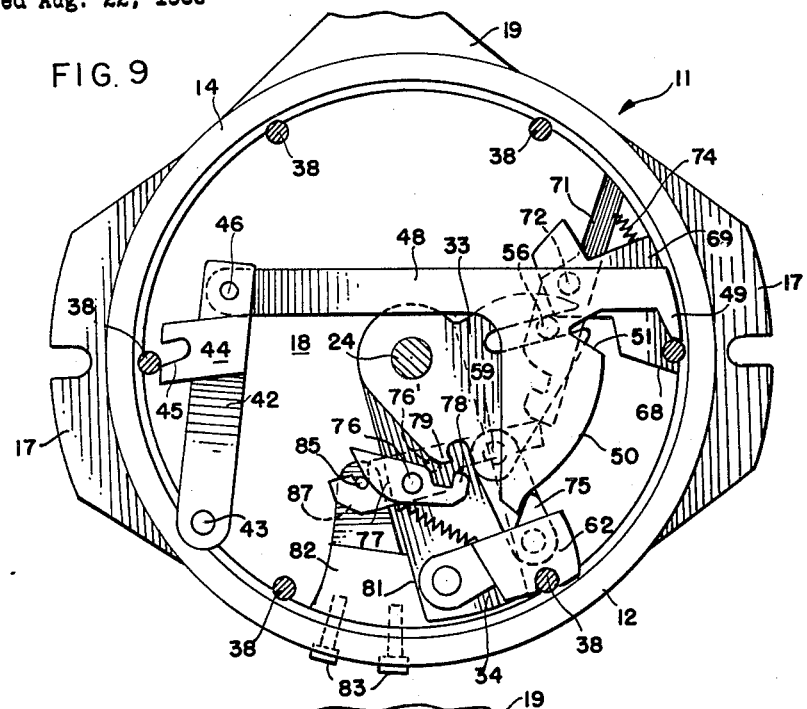

The link latch 77 may be formed with a latch receiving cam 84 in position to engage a latch releasing pin 85 carried on the bracket 82, as the link 34 comes into engagement with the stop shoulder 81. Accordingly, the latch 77 may be retracted against the influence of the spring 80 in order to release the lug 79 and thereby disconnect the link 33 from the link 34, as the table turning mechanism reaches the projected position determined by the stop shoulder 81, as shown in Fig. 9. The link 34 may also carry a latch member 86 having a hooked portion 87 at one end thereof in position to latchingly engage with the pin 85 as the table turning mechanism reaches its projected position. This latch member 86 may be pivotally mounted on the link 34, as on a pivot pin 76' located on the link 34 adjacent the latch pivot pin 76. A spring 88, connected between the latch member 86 and an anchorage pin on the link 34, may be provided for normally urging the latch member on its pivot pin in a direction toward latching engagement with the pin 85.

The end 89 of the latch member 86, on the side of the pivot 76' remote from the latching portion 87, may extend adjacent the pin 59, on the link 33, the spring 88 normally urging the member 86 yieldingly in a direction to move its end 89 toward the pin 59. Accordingly, as and when the table turning mechanism reaches the projected position in which the link 34 engages the stop bracket 82, the link 34 will become latched with the bracket 82 by engagement of the member 86 with the latching pin 85. In the same instant, the link 33 will become unlatched from the link 34 by retraction of the latch 77. During projecting movement of the table turning mechanism, the driving dog 62 will have traveled from the position shown in Fig. 8 to the relative position shown in Fig. 9, the nose 75 of the dog traversing the cam surface 50 during such movement. Accordingly, the nose 75 of the dog will be presented in abutting relationship with the cam 50 when the mechanism reaches its fully projected position shown in Fig. 9.

At the conclusion of the projecting movement of the table turning mechanism, the motor means 21 may be reversed in order to cause axial retraction of the driving stem 58 in a direction outwardly of the seat 20. If desired, such reversal may be accomplished under the control of a microswitch 90 mounted on the frame 12 in position to be operated by a rod 91 which is normally urged toward retracted position, as by means of a biasing spring 91', the rod being drivingly connected with an actuating member 92, said member being pivotally supported on the spindle 24. The member 92 has an arm 93, the end of which normally engages the stop pin 85 under the influence of the biasing spring 91'. The pin engaging end of the arm 93 may be formed with a flange 93' in position to be engaged by the hooked nose portion 87 of the latch member 86 when the same becomes latchingly engaged with the pin 85, to thereby turn the member 92 and move the rod 91 against the influence of the spring 91' sufficiently to actuate the switch 90.

Any preferred or convenient motor means 21 may, of course, be employed for moving the rod 58. Indeed, if desired, the rod 58 may be provided with a handle outwardly of the seat 20 for permitting manual operation of the rod; or motor driven cam means may be employed for reciprocating the rod. As shown, however, the motor means 21 may comprise a fluid pressure actuated piston 94 connected with the rod 58 and operable in a cylinder 95 suitably secured on the frame 12 at the seat 20. The motive means may include suitable fluid supply conduits, connected with the cylinder for the delivery and discharge of a fluid actuating medium to and from the cylinder. Such conduits may include valve means 96, controlled electrically, as by means of solenoids 97 and 98, and adapted to control the valve means in order to apply the fluid medium in the cylinder to project and retract the shaft 58.

Suitable electrical circuit means may be provided for energizing the solenoids 97 and 98, respectively, under the control of a push button 99 and the microswitch 90, in order to accomplish the desired operating cycle of the mechanism in automatic fashion.

Figure 10:
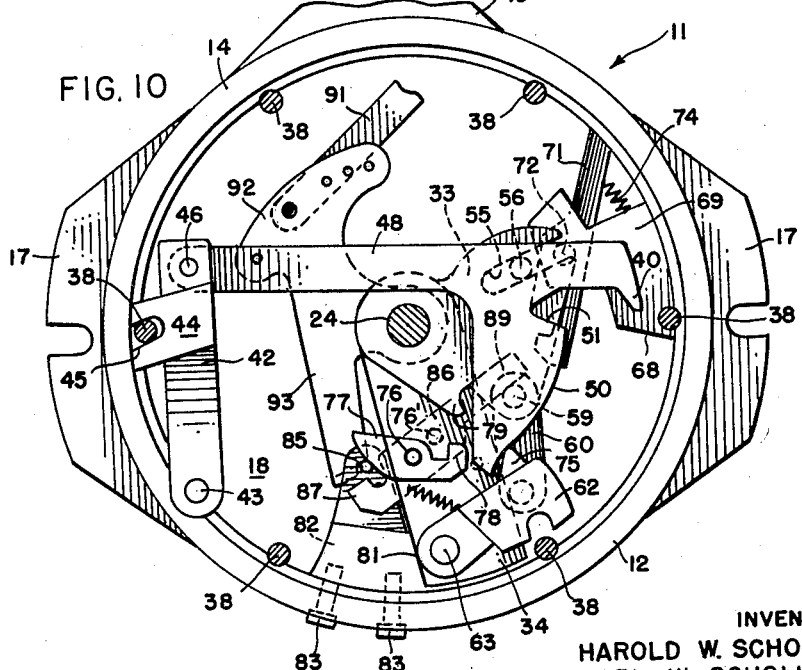

Upon actuation of the microswitch 90, retraction of the stem 58 will initially move the link 33 in a counterclockwise direction, to shift the mechanism components from the positions shown in Fig. 9 to the relative positions illustrated in Fig. 10. Such movement will cause retraction of the dog 62 and disengagement thereof from the pin 38. Such dog disengaging movement, by action of the nose portion 75 upon the cam 50, will move the member 48 in a direction to shift the latch 42 into latching engagement with the pin 38, then in registration with the latching slot 45. During such retraction of the dog 62, movement of the link 33, relative to the link 34, will press the pin 59 upon the end 89 of the latch member 86 and move the same against the influence of the spring 88, in a direction to release the latching portion 87 from the pin 85, thereby releasing the link 34 for retracting movement, along with link 33, during the remainder of the retracting movement of the stem 58 toward starting or standby position; that is to say, the position shown in Fig. 7 of the drawings.

During such remainder of the retracting movement of the mechanism, the nose 75 of the dog will ride along the cam surface 50 until the mechanism reaches retracted position determined by engagement of the link 34 with the stop shoulder 68 of the bracket 69. As the mechanism reaches such retracted position, the latch 71 will become engaged with the pin 73 on the link 34 to secure the parts in retracted position. When in such retracted position, the cam following nose portion 75 of the dog 62 will be loosely accommodated in the notched portion 51 of the member 48. This makes it possible to release the latch 42 manually in order to permit the table 13 to be rotated to any desired position while the motor means 21 remains inactive with the driving dog 62 in retracted position. Such release of the latch may be accomplished by means of a manually operable member connected with the latch and extending outwardly of the frame 12, as through an opening in the wall 14.

The table 13 may be fitted with any desired number of indexing pins 38, in order to provide a corresponding number of indexing positions. It will be understood, of course, that the table turning mechanism must be calibrated or adjusted to turn the table through an appropriate displacement angle depending upon the number of indexing pins that are provided in the table member 13. The following table indicates the adjustment required for the accommodation of tables affording several different indexing displacement angularities:

| Number of pins | Number of indexing positions | Required angularity of table turning movement, degrees |
|---|---|---|
| 6 | 6 | 60 |
| 9 | 9 | 40 |
| 12 | 6 | 60 |
| 12 | 12 | 30 |
| 18 | 6 | 60 |
| 18 | 9 | 40 |
| 18 | 18 | 20 |
| 36 | 6 | 60 |
| 36 | 9 | 40 |
| 36 | 12 | 30 |
| 36 | 18 | 20 |
| 36 | 36 | 10 |

Obviously, the calibration or adjustment required for any particular number of indexing positions may be built permanently into an indexing mechanism during the construction. The present invention, however, contemplates the provision of table turning mechanism which can be adjusted from time to time to change the displacement of its table turning movement, in order to calibrate the same for operation in a desired number of indexing positions. As a consequence, an indexing mechanism made in accordance with the present invention may be calibrated to provide for operation in a desired number of indexing positions by providing a table 13 having an appropriate number of indexing pins and by setting the stop bracket 82 in place on the wall 14 of the frame to appropriately limit the table turning movement of the link 34 to that required for the desired calibration; and since the switch actuating member 92 is normally held in operative position by the pin 85 of the stop bracket, the member 92 is provided with a plurality of pivot holes 100, respectively corresponding with the several adjusted positions in which the bracket 82 may be mounted, so that the switch actuating link 91 may be supported in normal switch operating position regardless of the adjusted position of the stop bracket.

If desired, the walls 14 of the frame may be formed with means for receiving and securing the stop bracket in any desired one of a plurality of adjusted positions, such as, say, the four, six, nine, twelve and eighteen station positions which can be selectively utilized with a table containing thirty-six pins. Ordinarily, however, it is expedient to produce each indexing device to serve a fixed number of stations, as, for example, the six stations served by the specific embodiment illustrated herein.

Apparatus embodying the present invention, however, without change in any constituent part, can be assembled to produce a device providing any desired fixed number of indexing positions within the range allowed by the adjustability of the component parts. Thus, the component parts forming the six position apparatus illustrated could have been assembled and, indeed, may be reassembled to form devices providing any desired fixed number of indexing positions merely by providing the required number of pins 38 in the table 13, by fastening the bracket 82 on the wall 14 in appropriate spacement with respect to the bracket 69 and by attaching the link 91 in an appropriate hole 100 on the member 92.

Any suitable or preferred means, of course, may be provided for anchoring a work piece or pieces, or a tool or tools, upon the turntable 13. To this end, a carrying plate, having marginal portions adapted to project outwardly of the peripheral edge of the table 13, may be provided for attachment on the table. Such carrying plate may be bolted or otherwise secured on the table 13, in centered position thereon; and work holding jigs or fixtures, or tools may be secured on the carrying plate in any desired, convenient or conventional fashion, so that the same may be presented successively in accurately indexed position by operation of the indexing mechanism herein described.

It is thought that the invention and its numerous attendant advantages will be fully understood from the foregoing description, and it is obvious that numerous changes may be made in the form, construction, and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Indexing apparatus comprising a plate turnable about a fixed axis, a plurality of circularly spaced apart index teeth mounted on said plate, normally inactive driving means turnable about said fixed axis, from a retracted starting position toward a projected indexing position, to move said plate from one indexed position toward a desired new indexed position, including reversing means for returning said driving means from projected to retracted starting position, and stop means for halting plate turning movement when the plate reaches said desired new indexed position, said stop means being adjustable to vary the indexing displacement of the plate, whereby to calibrate the apparatus for any desired indexing displacement within its operating range, control means for actuating said reversing means, said control means comprising an actuating member movable by said driving means in projected indexing position, and a link drivingly connectable with said actuating member in any one of a plurality of anchorage positions respectively corresponding with the positions of adjustment of said stop means, whereby to present said link in position to actuate said reversing means for all adjusted positions of the stop means.

2. Indexing apparatus comprising a plate turnable about a fixed axis, a plurality of circularly spaced apart index teeth mounted on said plate, normally inactive driving means movable into driving engagement with a said tooth, said driving means being turnable about said fixed axis, from a retracted starting position toward a projected indexing position, to move said plate from one indexed position toward a desired new indexed position, including means for withdrawing said driving means from driving engagement with said tooth and for returning the same from projected to retracted starting position, stop means for halting plate turning movement when the plate reaches said desired new indexed position, said stop means being adjustable to vary the indexing displacement of the plate, whereby to calibrate the apparatus for any desired indexing displacement within its operating range, a reversible motor for actuating said driving means, means operable to start the motor in one direction to project the driving means from starting position, control means operable to reverse the motor, and operating means actuated by the driving means, as it reaches its projected position determined by said stop means, to operate said control means, said operating means being adjustable to accommodate the several adjusted positions of said stop means.

3. Indexing apparatus comprising a plate turnable about a fixed axis, a plurality of circularly spaced apart index teeth mounted on said plate, normally inactive driving means comprising an arm, turnable about said fixed axis, from a retracted starting position toward a projected indexing position, a dog normally supported in retracted position on said arm and projectible thereon into driving engagement with a said tooth, whereby to move said plate from one indexed position toward a desired new indexed position, in response to projecting movement of said arm, including reversing means for withdrawing said driving means from driving engagement with said tooth and for returning the same from projected to retracted starting position, and stop means for halting plate turning movement when the plate reaches said desired new indexed position, said stop means being adjustable to vary the indexing displacement of the arm, whereby to calibrate the apparatus for any desired indexing displacement within its operating range, control means for actuating said reversing means, said control means comprising an actuating member movable by said driving means in projected indexing position, and a link drivingly connectable with said actuating member in any one of a plurality of anchorage positions respectively corresponding with the positions of adjustment of said stop means, whereby to present said link in position to actuate said reversing means for all adjusted positions of the stop means.

4. Indexing apparatus comprising a plate turnable about a fixed axis, a plurality of circularly spaced apart index teeth mounted on said plate, normally inactive driving means comprising an arm, turnable about said fixed axis, from a retracted starting position toward a projected indexing position, a dog normally supported in retracted position on said arm and projectible thereon into driving engagement with a said tooth, whereby to move said plate from one indexed position toward a desired new indexed position, in response to projecting movement of said arm, including means for withdrawing said driving means from driving engagement with said tooth and for returning the same from projected to retracted starting position, stop means for halting plate turning movement when the plate reaches said desired new indexed position, said stop means being adjustable to vary the indexing displacement of the arm, whereby to calibrate the apparatus for any desired indexing displacement within its operating range, a reversible motor drivingly connected with said dog and operable in one direction to actuate said driving means, means operable to start the motor in one direction to project the driving means from starting position, control means operable to reverse the motor, operating means actuated by the driving means, as it reaches its projected position determined by said stop means, to operate said control means, said operating means being adjustable to accommodate the several adjusted positions of said stop means, and latching means for holding the said arm in retracted position during initial projecting movement of the dog thereon toward driving engagement with a said tooth, including means operable to release said latching means, as the dog drivingly engages the tooth, to thereafter permit the motor to turn the arm and dog indexingly toward the projected position determined by said stop means.

5. Indexing apparatus comprising a plate turnable about a fixed axis, a plurality of circularly spaced apart index teeth mounted on said plate, normally inactive driving means comprising an arm, turnable about said fixed axis, from a retracted starting position toward a projected indexing position, a dog normally supported in retracted position on said arm and projectible thereon into driving engagement with a said tooth, whereby to move said plate from one indexed position toward a desired new indexed position, in response to projecting movement of said arm, including means for returning said driving means from projected to retracted starting position, stop means for halting plate turning movement when the plate reaches said desired new indexed position, said stop means being adjustable to vary the indexing displacement of the arm, whereby to calibrate the apparatus for any desired indexing displacement within its operating range, a reversible motor drivingly connected with said dog and operable in one direction to initially project the dog on the arm, into driving engagement with a said tooth, and thereafter to turn the dog and arm about said fixed axis toward projected indexing position, means operable to start the motor in one direction to project the driving means from starting position, control means operable to reverse the motor, operating means actuated by the driving means, as it reaches its projected position determined by said stop means, to operate said control means, said operating means being adjustable to accommodate the several adjusted positions of said stop means, and latching means for securing the arm in projected indexing position, whereby, upon reversal of the motor, the dog may be initially retracted on the arm from driving engagement with a said tooth, including means for releasing said latching means, as the dog reaches a retracted position on the arm, to thereafter permit the latch and arm to be returned to starting position.

6. Indexing apparatus comprising a plate turnable about a fixed axis, a plurality of circularly spaced apart index teeth mounted on said plate, a latch in position to engage said teeth, when the teeth are presented in alinement with said latch, to thereby hold the plate in indexed positions corresponding with said teeth, normally inactive driving means comprising an arm, turnable about said fixed axis, from a retracted starting position toward a projected indexing position, a dog normally supported in retracted position on said arm and projectible thereon into driving engagement with a said tooth, whereby to move said plate from one indexed position toward a desired new indexed position, in response to projecting movement of said arm, including means for retracting said dog on said arm, when in projected indexing position to release the dog from tooth driving engagement and thus condition the driving means for return to starting position, adjustable stop means for halting plate turning movement of said arm in a desired indexing position, a reversible motor for actuating said driving means, means operable to start the motor in one direction to project the driving means from starting position, control means operable to reverse the motor, operating means actuated by the driving means as it reaches its projected position determined by said stop means, to operate said control means, said operating means being adjustable to accommodate the several adjusted positions of said stop means, and latch actuating means operable to retract said latch from tooth latching movement in response to projecting movement of the dog on the arm, said latch actuating means including a cam member operable to project said latch into tooth latching position in response to retracting movement of the dog on the arm, in any projected position thereof determined by said stop means.

7. Indexing apparatus comprising a plate turnable about a fixed axis, a plurality of circularly spaced apart index teeth mounted on said plate, normally inactive driving means comprising an arm, turnable about said fixed axis, from a retracted starting position toward a projected indexing position, a dog normally supported in retracted position on said arm and movable thereon into projected position drivingly engaged with a said tooth, a reversible motor drivingly connected with said dog and operable in one direction initially to project the dog on the arm and thereafter to move the arm, with the dog thereon in projected position, and thus turn said plate from one indexed position toward a desired new indexed position, stop means for halting turning movement of said arm and dog when the plate reaches said desired indexed position, said stop means being adjustable to vary the indexing displacement of the plate, whereby to calibrate the apparatus for any desired indexing displacement within its operating range, control means operable to reverse said motor when said arm reaches its projected position, whereby initially to retract the dog on the arm from tooth driving engagement and thereafter to return the arm to starting position, with the dog in retracted position thereon, and operating means actuated by the driving means, at it reaches its projected position determined by said stop means, to operate said control means, said operating means being adjustable to accommodate the several adjusted positions of said stop means.

8. Indexing apparatus comprising a plate turnable about a fixed axis, a plurality of circularly spaced apart index teeth mounted on said plate, normally inactive driving means turnable about said fixed axis, from a retracted starting position toward a projected indexing position, to move said plate from one indexed position toward a desired new indexed position, stop means for halting such turning movement when the plate reaches said desired indexed position, a reversible motor operable in one direction to move the driving means from retracted toward projected position, control means for reversing the motor to return said driving means to starting position, and a member drivingly connected with said control means and turnable about said fixed axis to actuate said control means as said driving means reaches projected position.

9. Indexing apparatus comprising a plate turnable about a fixed axis, a plurality of circularly spaced apart index teeth mounted on said plate, normally inactive driving means turnable about said fixed axis, from a retracted starting position toward a projected indexing position, to move said plate from one indexed position toward a desired new indexed position, stop means for halting such turning movement when the plate reaches said desired indexed position, said stop means being adjustable in any one of a number of adjustment positions to vary the indexing displacement of the plate, whereby to calibrate the apparatus for any desired indexing displacement within its operating range, a reversible motor operable in one direction to move the driving means from retracted toward projected position, control means for reversing the motor to return the driving means to starting position, actuating means for said control means including an actuating member turnable about said fixed axis, from a standby position determined by said stop means, as said driving means reaches projected position, and a link movable to actuate said control means, said link being drivingly connected with said member at any selected one of a plurality of connection stations, angularly displaced on the member about said fixed axis, said stations corresponding with the several adjustment positions of the stop means.

10. Indexing apparatus comprising a plate turnable about a fixed axis, a plurality of circularly spaced apart index teeth on said plate, a latch in position to engage said teeth to hold the plate in indexed positions corresponding therewith, normally inactive driving means turnable about said fixed axis, from a retracted starting position toward a projected indexing position, to move said plate from one indexed position toward a desired new indexed position, including reversible motor means for moving and returning said driving means to and from projected from and to retracted starting position, stop means for halting plate turning movement when the plate reaches said desired new indexed position, said stop means being adjustable to vary the indexing displacement of the plate, whereby to calibrate the apparatus for any desired indexing displacement within its operating range, means operable to actuate the motor means in one direction to project the driving means from its starting position, control means operable to reverse the motor, operating means actuated by the driving means, as it reaches its projected position determined by said stop means, to operate said control means, said operating means being adjustable to accommodate the several adjusted positions of said stop means, means actuated in response to operation of said driving means for releasing said latch from engagement with said teeth, and manually operable means for releasing the latch without actuating the normally inactive driving means, whereby the turnable plate may be twirled on its axis, at will, and turned to any desired indexed position.

11. Indexing apparatus as set forth in claim 5, including a latch disposed in position to engage each of said teeth to hold the plate in any selected one of a number of index positions corresponding with said teeth when in latching registration with said latch, means actuated by the driving means for releasing the latch from engagement with a said tooth, and manually operable means for releasing the latch from engagement with a tooth without actuating the normally inactive driving means, whereby the turnable plate may be twirled on its axis, at will, to any desired indexed position.

References Cited in the file of this patent

UNITED STATES PATENTS

| | | |
|---|---|---|
| 350,142 | Leman | Oct. 5, 1886 |
| 1,180,558 | Adler | Apr. 25, 1916 |
| 2,262,103 | Laessker | Nov. 11, 1941 |
| 2,359,420 | Herzog | Oct. 3, 1944 |
| 2,421,327 | Hallowell | May 27, 1947 |
| 2,600,960 | Benjamin et al. | June 17, 1952 |